May 14, 1935.  J. W. STRIBLING  2,001,507
LATCH MECHANISM
Filed Aug. 16, 1934   2 Sheets-Sheet 1
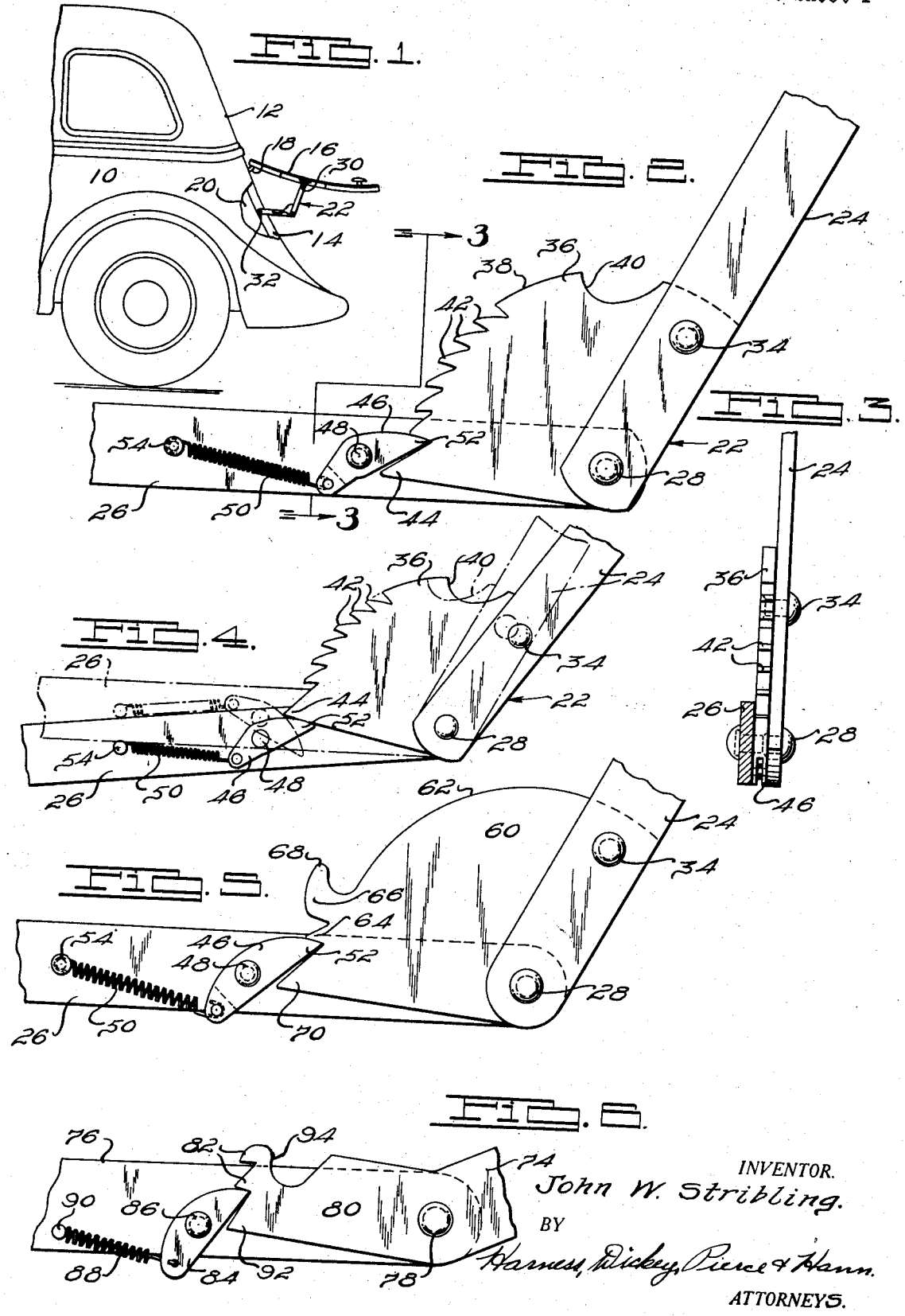
INVENTOR.
John W. Stribling.
BY
Harness, Dickey, Pierce & Hann.
ATTORNEYS.

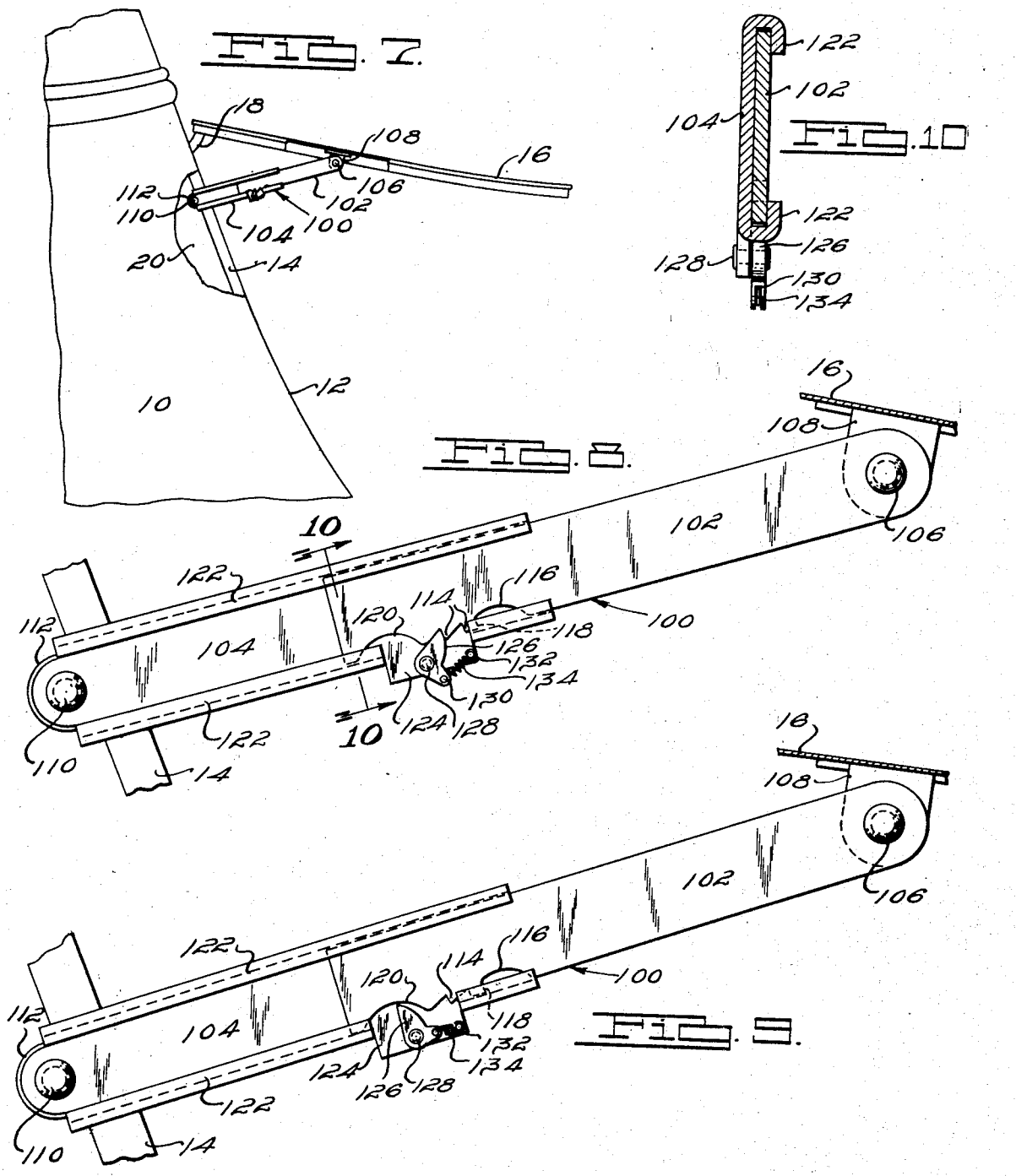

Patented May 14, 1935

2,001,507

UNITED STATES PATENT OFFICE 2,001,507

LATCH MECHANISM

John W. Stribling, Detroit, Mich., assignor to George Hunt, Detroit, Mich.

Application August 16, 1934, Serial No. 740,105

10 Claims. (Cl. 217—60)

This invention relates to latch mechanism of the type adaptable to hold a lid, door, or any other pivoted panel or member in open position and adapted to be automatically released from its latched relation by a further opening movement of the member, the principal object being the provision of a device of this type that is simple in construction, efficient in operation and economical to produce.

Objects of the invention include the provision of a device of the class described including a pair of members movably associated with each other, one of the members being provided with one or more ratchet teeth and the other member being provided with pivotal dog engageable with the ratchet teeth; the provision of a construction as above described in which the members may be moved to cause the dog to pass completely over the ratchet teeth, the dog being so mounted that upon reversal of movement of the members the dog will ride over the teeth during the reverse movement; the provision of a construction as above described wherein means are provided for restoring the dog to its operative position for engagement with the ratchet teeth after the dog has been drawn over the teeth in a reverse direction; and the provision of a latch mechanism including a pair of members movably associated with each other, one of which is provided with ratchet teeth and the other of which is provided with a dog engageable therewith and in which the dog may be caused to pass completely over the ratchet teeth to permit the dog to be automatically moved out of normal operative engagement therewith, means being provided for effecting a sensible signal to the operator of the latch mechanism to indicate the pivotal position of the members relative to one another at about the time the dog is about to pass beyond the end of the ratchet teeth during opening movement; the provision of a latch device including a pair of strip metal members pivotally connected together, the end portion of one of the members projecting beyond the pivotal point thereof and being bent out of alignment with the longitudinal axis of the member, the end of such bent end portion being formed to provide ratchet teeth, and a dog being pivotally mounted upon the other of the members in a position to engage said ratchet teeth; and the provision of a latch device including a pair of members slidable longitudinally with respect to each other, one of the members being provided with ratchet teeth and the other being provided with a dog engageable with said teeth for locking the members against retraction in length during a predetermined range of movement between said members in one direction only.

The above being among the objects of the present invention, the same consists in certain novel features of construction and combinations of parts to be hereinafter described with reference to the accompanying drawings, and then claimed, having the above and other objects in view.

In the accompanying drawings which illustrate suitable embodiments of the present invention and in which like numerals refer to like parts throughout the several different views, Fig. 1 is a fragmentary side elevational view of a motor vehicle provided in its rear wall with a pivotal panel or cover, the panel being shown in open position and part of the vehicle body being shown broken away to better illustrate the construction.

Fig. 2 is an enlarged fragmentary side elevational view of one of the latch members employed in connection with the pivotal panel or cover shown in Fig. 1.

Fig. 3 is a sectional view taken on the line 3—3 of Fig. 2.

Fig. 4 is a view similar to Fig. 2 but on a reduced scale and illustrating the position of the members after the dog has passed over the ratchet teeth during opening movement.

Fig. 5 is a view similar to Fig. 2 showing a modified form of construction.

Fig. 6 is a view similar to Fig. 2 showing another modified form of construction.

Fig. 7 is a view similar to Fig. 1 showing the application of another modified form of latch mechanism to the rear panel or cover of a vehicle body.

Fig. 8 is an enlarged side elevational view of the latch mechanism shown in Fig. 7 the mechanism being shown in a position to hold the panel or cover in open position.

Fig. 9 is a view similar to Fig. 8 but showing the latch mechanism moved beyond its normal fully open position so as to release it to permit the panel or cover to be closed.

Fig. 10 is an enlarged sectional view taken on the line 10—10 of Fig. 8.

Generally speaking, it is old in the art to provide a latch mechanism in combination with a lid or other pivoted cover or panel of such a construction that when the lid is opened to a normal extent the latch mechanism will operate to hold it in such position and when it is desired to close the lid, cover or other pivoted panel it is simply opened to an extent beyond its normal fully opened position to automatically release the latching mechanism and permit the lid, cover or pivoted panel to close without the necessity of manually effecting the release of the latching mechanism. As far as I am aware, however, the constructions heretofore proposed have been of a rather complicated nature, too liable to injury by hard usage or unduly expensive to produce. Accordingly, the principal object of the present invention is to provide a device as above described which is efficient in operation, rugged in construction and both simple and economical to produce.

Although the present invention is not to be limited in its use thereto as it is usable in connection with any pivoted closure or the like, it is particularly applicable for use in connection with the rear decks or rear panels of motor vehicle bodies and, accordingly, its application thereto will be described, its application to other devices or members being apparent therefrom. As is well understood in the art, motor vehicle bodies of the coupé or roadster type are provided with back decks having pivotable covers or lids by means of which access may be gained to the interior of the back deck. More recently bodies of the sedan or coach type have been provided with pivotal panels in the rear wall through which access may be gained to a storage compartment in advance of such wall for the purpose of storing tires or other material therein. Heretofore it has been the custom of body manufacturers to provide such lids or covers with a simple latch mechanism which usually is self latching when the lid or cover is raised but which must be manually released by the operator when it is desired to close the lid or cover. In view of the fact that such lids or covers are becoming of larger dimensions and of heavier construction and because of the inevitable collection of dust in and around such covers, it not only becomes a hardship to release such lids or covers together with the risk of the operator soiling his wearing apparel, but additionally, unless care is exercised upon release, the lid or cover may fall and cause injury to the operator. The present invention is particularly designed for use in connection with such lids or covers so as to obviate the heretofore existing disadvantages therein.

Referring now to the accompanying drawings, in Fig. 1 an automobile body is illustrated generally at 10 and as having a rear wall 12. The rear wall 12 is provided with an opening 14 therein and a panel or cover 16 pivotally connected thereto by hinge members 18 situated at its upper edge. It will be understood that upon opening the cover 16 access may be had through the opening 14 to a compartment 20 between the rear seat (not shown) of the body 10 and the rear wall 12 for the purpose of storing tires or other material therein. A latch mechanism illustrated generally at 22 is provided for holding the cover 16 in raised position when desired. This latch mechanism is shown in detail in Figs. 2, 3 and 5 and, as illustrated in those figures, is seen to consist of two strip metal members 24 and 26, respectively, the cooperating ends of which are pivotally connected together as by means of the rivet 28. It will be understood as illustrated in Fig. 1 that the opposite ends of the members 24 and 26 are pivotally connected as at 30 and 32, respectively, to the lid 16 and body 10, respectively.

The member 24 has fixed thereto as by means of the rivet 28 and an additional rivet 34, a segmental shaped plate 36. The plate 36 has a generally arcuately shaped edge 38 whose center is coincident with the axis of the rivet 28 and the plate 36 is secured to the member 24 with one edge thereof aligned with the edge of the member 24. The surface 38 of the plate 36 adjacent the member 24 is cut out or notched as at 40 for a purpose which will hereinafter be described, and the edge 38 is also formed to provide a plurality of ratchet teeth 42 thereon. The plate 36 at the end of the surface 38 opposite the notch 40 is formed to provide an abnormally long or extended tooth or projection 44.

A dog 46 is pivotally secured between its ends to the member 26 by means of a rivet 48, the dog 46 being positioned on that face of the member 26 to bring it into coplanar relationship with respect to the plate 36 and it is so positioned on the member 26 as to locate it for operative engagement with the ratchet teeth 42. A coil spring 50 is maintained under tension between that end of the dog 46 opposite its point 52 and a pin 54 fixed to the member 26.

The latch is shown in its normal fully open operative position in Fig. 2 wherein it will be noted that the point 52 of the dog 46 is engaged against the last ratchet tooth 42 next adjacent the abnormally long tooth or projection 44 and in such position prevents clockwise movement of the member 26 with respect to the member 24. When the latch is in the position indicated in Fig. 2 and employed in the construction illustrated in Fig. 1 it will be apparent that the cover 16 will be held in its normally fully open position. If the latch mechanism is now moved from the position indicated in Fig. 2 to that illustrated in full lines in Fig. 4, as by lifting the rear or free edge of the cover 16 upwardly beyond its normal fully open position, the member 26 will be caused to rotate in a counter-clockwise direction with respect to the member 24 and the point 52 of the dog 46 will be caused to ride over the abnormally long tooth or projection 44 until it is completely free thereof as indicated in Fig. 4. If now the rear or free edge of the cover 16 is allowed to drop so as to cause the member 26 to move in a clockwise direction with respect to the member 24 the abnormally long tooth or projection 44 will cause the dog 46 to rotate in a clockwise direction as indicated in dotted lines in Fig. 4 and, upon continued clockwise direction of movement of the member 26 with respect to the member 24, the point 52 of the dog 46 will simply ride over the teeth 42 and the cover 16 may thus be moved to closed position. When the cover is in closed position the point 52 of the dog 46 will drop into the notch 40.

Assuming now, that the point 52 of the dog 46 lies within the notch 40 and the cover 16 is in closed position, if it is desired to open the cover 16 the lower or rear edge thereof is grasped and lifted thus causing the member 26 to move in counter-clockwise direction of movement with respect to the member 24, bringing the pointed end of the dog 46 into contact with the left hand edge of the notch 40 as illustrated in Figs. 2 and 4 and this will cause the dog 46 to be rotated about its pivotal axis in a counter-clockwise direction and upon continued movement of the members 26 and 24 in the direction stated the point 52 of the dog 46 will again be brought into operative relation with respect to the teeth 42. The edge of the notch 40 nearest the teeth 42 is made pointed or hook-shaped in order to insure proper engagement with the dog to turn it to operative position even though the dog should stick slightly and its point 52 not be moved to its fullest extent under the influence of the spring 50 when in the notch 40. Should the opening movement of the cover 16 be discontinued while the point 52 is passing over any of the teeth 42 during opening movement of the cover 16 it will engage the corresponding tooth 42 and hold the cover 16 against closing from such position. As will also be understood, if it is desired to close the cover from such position it is first necessary to open it beyond its normal fully open position so as to again bring the dog 46 beyond the abnormally long tooth or projection 44 to again permit the position of the dog 46 to be reversed as indicated in Fig. 4.

By this simple and efficient means the cover 16 may be automatically latched in any elevated position corresponding to the particular tooth 42 which the dog 46 engages and when it is desired to close the cover 16 all that is necessary is to elevate or open the cover 16 to the proper extent and then allow it to close. Thus it is not necessary with this device to manually unlock the latch with all of the attendant dangers and disagreeableness thereof when it is desired to close the cover 16.

It will be understood that the abnormally long tooth or projection 44 is not essential to the above described operation of the latch shown, the abnormally long tooth or projection 44 being provided for the following reasons. If the projection 44 was not employed it might be difficult for those uninitiated with the normal fully open latch position of the cover 16 to accurately determine such position and they might inadvertently open the cover 16 to such a great extent as to cause the dog 46 to ride over the end tooth 42 when opening the cover and thus reverse the positioning of the dog 46 so as to permit the cover to drop. The projecting end of the tooth or projection 44 is projected into closely adjacent relationship with respect to the rivet 48 forming the pivotal support for the dog 46 when these two parts are aligned, so that in opening the cover 16 as soon as the point 52 of the dog 46 has passed over the last ratchet tooth 42 in the direction of opening movement, the tooth or projection 44 will contact the dog 46 and, because of its abnormally projecting end and the tension of the spring 50, will require a considerably increased amount of effort to cause the abnormal pivoting movement of the dog 46 required to rotate it sufficiently to permit it to pass over the tip of the tooth or projection 44. This increased amount of resistance to forcing the dog 46 over the end of the tooth or projection 44 is a sensible signal to the operator of the cover 16 to indicate when the cover 16 has been raised to its normal fully open position and thus serves as an alarm to indicate that further movement of the cover 16 toward open position will result in releasing the latch mechanism.

In Fig. 5 a modified form of construction is shown which is identical to the construction shown in the previously described figures with the exception that the plate 36 is replaced by a plate 60. In this case the arcuate outer surface 62 of the plate 60 is positioned at such a distance from the axis of the rivet 28 that the point 52 of the dog 46 will clear it when positioned over such surface. Only two latching ratchet teeth 64 and 66 are provided in this case, thus more closely limiting the positioning at which the cover 16 may be latched in open position. The tooth 66 in this case is extended as at 68 so that when the latch is being opened as by raising the cover 16 the end of the extension 68 will contact the dog 46 and rotate it to the proper position for engagement with the teeth 64 and 66 to lock the device in open position. An abnormally long tooth or projection 70 corresponding in all respects and functions to the tooth or projection 44 previously described is provided in this construction.

The tooth 68 is also shown extended beyond the tooth 64 in a manner similar to the tooth 70 so that the dog 46 in contacting and being forced over the tooth 68 during opening movement will offer a sensible resistance which will be transmitted to the operator as an indication that latching position has been reached. This is particularly desirable where only a few teeth are employed as in such case the permissible latching position is more or less limited.

In Fig. 6 a still more simple form of construction is shown in which the members 74 and 76 correspond to the members 24 and 26 previously described and are pivotally connected together by means of a rivet 78. In this case instead of providing a separate plate such as 36 or 60, the end of the member 74 is extended as at 80 but is angularly offset with respect to the length of the member 74. The outer end of the extension 80 is formed to provide a pair of ratchet teeth 82 for cooperation with a dog 84 pivoted to the member 76 by means of the rivet 86 and adapted for cooperation with the ratchet teeth 82 in the same manner as the construction previously described. A spring 88 maintained under tension between the end of the dog 84 opposite its point and a suitable anchor 90 serve the same purpose as the spring 50 previously described. The projecting end 80 of the member 74 is provided with an abnormally long or extending tooth or projection 92 corresponding in construction and function to the teeth or projections 44 and 70 previously described and is also provided with a notch 94 serving the same purpose as the notch 40 described in connection with Figs. 2, 3 and 4.

In the construction illustrated in Figs. 2 to 5 inclusive, the plates 36 and 60 are preferably made separately from the member 24 for economy in manufacture and are preferably riveted in place as described so that rights and lefts may be made up from identical pieces. In the construction illustrated in Fig. 6, both members 74 and 76 may be made of strip stock and without bending them out of the normal plane of their wide faces.

In Figs. 7 to 10, inclusive, a modified form of latch construction is shown including a pair of members which are slidably, instead of pivotally, connected together, and which is illustrated generally in Fig. 7 at 100 as comprising two main members 102 and 104, respectively. The outer end of the member 102 is pivotally connected as by means of a rivet 106 to a bracket 108 fixed to the cover 16, and the inner end of the member 104 is pivotally connected by means of a rivet 110 to a bracket 112 secured to the framing of the opening 14 in the body 10, although, as will hereinafter be apparent, this end of the member 104 may be located inwardly of the opening 14 if desired. In the construction shown, when the cover 16 is in closed position the latch mechanism 100 will lie in substantially parallelism thereto.

Referring now to Figs. 8 to 10, inclusive, it will be noted that the member 102 is formed from a strip of sheet or plate metal and that end thereof opposite its point of pivotal connection with the bracket 108 is formed on one edge to provide one or more ratchet teeth 114 bounded at one end by a notch 116, corresponding in function to the notch 40 in a previously described construction, and providing a hook-like projection 118 at that end thereof nearest the teeth 114 for the same purpose as in the previously described construction. Also at the opposite end of the teeth 114 the edge of the member 102 is cut away to provide a notch 120 of sufficient depth to permit the corresponding dog, which will hereinafter be described, to swing freely therein between operative and inoperative positions.

The member 104 is preferably formed from a strip of sheet metal which is wider than the width of the member 102 and its opposite edge margins are reversely bent as at 122, as best brought out in Fig. 10, so as to receive and confine opposite side edges of the member 102 thereunder and thus guide the member 102 for relative longitudinal movement longitudinally of the member 104. A portion of that edge of the member 104 corresponding to that edge of the member 102 formed to provide teeth 114 and notches 116 and 120, instead of being reversely bent to form a guide for the member 102 is allowed to remain in coplanar relationship with respect to the main body portion of the member 104 as at 124, and a dog 126 corresponding to the dog 46 previously described is pivoted thereto by means of a rivet 128 in a position to enable it to engage the teeth 114 during a predetermined range of movement of the members 102 and 104. The dog 126 is provided with an arm 130 between which and a pin 132 on the portion 124 a coil spring 134 is normally maintained under tension. It will be understood that the dog 126 cooperates with the teeth 114 in a manner substantially similar to the corresponding parts of the construction previously described. In other words, if the cover 16 is in closed position and is lifted or opened it will cause a relative withdrawal of the member 102 from the member 104 and as soon as this movement is sufficient to bring the dog 126 into the notch 116 the hook 118 will engage the dog and upon continued opening movement of the cover 16 will cause the dog 126 to be pivoted to its operative position so that when brought into but not beyond engagement with the ratchet teeth 114 it will cooperate with one of the teeth 114 to prevent retraction of the member 102 relative to the member 104 and will thus lock the cover 16 in open position. If it is desired to close the cover 16 from its normal fully open position, it is simply opened to an extent sufficient to cause the members 102 and 104 to move sufficiently to bring the point of the dog 116 into the notch 120, and then upon allowing the cover 16 to move in a direction of closing, the dog 126 will engage the walls of the notch 120 and will be caused thereby to pivot to inoperative position and thereupon allow the member 102 to be freely retracted into the member 104 and thus permit the cover 16 to be moved to fully closed position.

Other modifications of the structures herein shown and described will be apparent to those skilled in the art upon disclosure of the principle here involved and, accordingly, it will be understood that formal changes may be made in the specific embodiment of the invention disclosed without departing from the spirit or substance of the broad invention, the scope of which is commensurate with the appended claims.

What is claimed is:

1. A latch mechanism comprising, in combination, a pair of members connected together for movement relative to each other, ratchet teeth fixed to one of said members, and a dog pivotally mounted on the other of said members in a position to be engageable with said teeth within a predetermined range of movement between said members, means acting on said dog tending to move it toward a neutral position, the first mentioned member having means so constructed and arranged relative to said dog and ratchet teeth as to cause said dog to pivot between operative and inoperative positions upon reversal of movement of said members after relative movement thereof in either direction beyond said predetermined range of movement.

2. A latch mechanism comprising, in combination, a pair of members connected together for movement relative to one another, ratchet teeth fixed with respect to one of said members, a dog pivotally mounted on the other of said members in a position to be engageable with said teeth within a predetermined range of movement between said members, spring means constantly urging said dog toward a predetermined position of rotation, and the first mentioned member having means so constructed and arranged relative to said ratchet teeth and dog that upon reversal of alternately opposite movements between said members beyond said predetermined range of movement said dog will be caused to be alternately moved between two different pivotal positions thereof.

3. A latch mechanism, in combination, a pair of members connected together for movement relative to one another, teeth fixed to one of said members, a dog movably mounted on the other of said members in a position to be engageable with said teeth within a predetermined range of movement between said members, means acting on said dog tending to move it into a neutral position, said members being relatively movable with respect to each other to positions beyond opposite limits of said predetermined range of movement to bring said dog out of a position of contact with said teeth, said members having means so constructed and arranged relative to said dog and teeth that reversal of movement thereof after movement thereof beyond said predetermined range of movement in alternately opposite directions will cause said dog to be alternately moved between operative and inoperative positions, and means fixed with respect to the first mentioned member engageable with said dog when said dog is about to pass out of said predetermined range of movement in one direction to set up a sensible resistance to further relative movement between said members in said direction.

4. A latch mechanism comprising, in combination, a pair of members pivotally connected together, teeth on one of said members, a dog pivotally mounted on the other of said members in a position to be engageable with said teeth within a predetermined range of pivotal movement between said members, means acting on said dog tending to move it into a neutral position, the first of said members having means so constructed and arranged relative to said teeth and dog as to engage said dog and alternately shift it between operative and inoperative positions with respect to said teeth when said members are moving toward said predetermined range of movement from alternately opposite directions.

5. A latch mechanism comprising, in combination, a pair of members pivotally connected together, ratchet teeth fixed with respect to one of said members, a dog pivotally mounted on the other of said members in a position to be engageable with said teeth within a predetermined range of movement between said members, spring means constantly urging said dog toward a predetermined position of rotation, the first mentioned member having means so constructed and arranged relative to said teeth and dog that upon reversal of alternately opposite movement between said members beyond said predetermined range of movement said dog will be caused to be alternately moved between two different pivotal positions thereof, and means for effecting a sensible resistance to further pivotal movement between said members when said dog is about to pass beyond said teeth during movement of said members in one direction.

6. A latch mechanism comprising, in combination, a pair of strip metal members pivotally connected together, the end of one of said members projecting beyond the point of pivotal connection of said members and being bent out of longitudinal alignment with the main body portion thereof, teeth formed on the free end edge of said end, and a dog pivoted to the other of said members in a position to be engaged by said teeth within a predetermined range of movement of said members.

7. A latch mechanism comprising, in combination, a pair of members arranged for longitudinal sliding movement with respect to each other, ratchet teeth fixed with respect to one of said members, a dog movably mounted on the other of said members in a position to be engageable with said teeth within a predetermined range of movement between said members, the first mentioned member being so constructed and arranged as to permit said dog to move between operative and inoperative positions when relatively moved in either direction beyond its range of normal operative engagement with said teeth.

8. A latch mechanism comprising, in combination, a sheet metal member having opposite marginal edges thereof reversely bent in spaced relation to the main body portion of said member to form a pair of spaced guides, a strip-like member slidably received by and confined in said guides, a portion of said edges being unbent and extending in the general plane of the main body portion of said member, teeth formed on that edge of the second mentioned member corresponding to the edge of the first mentioned member upon which said portion is located, said second member having notches formed in the toothed edge thereof at either end of said teeth, and a dog pivoted to said portion in a position to be engageable with said teeth upon a predetermined range of movement between said members and being freely movable through said notches when aligned therewith.

9. A latch mechanism comprising, in combination, a pair of members connected together for movement relative to one another, ratchet teeth fixed with respect to one of said members, a dog pivotally mounted on the other of said members in a position to be engageable with said teeth within a predetermined range of movement between said members, spring means constantly urging said dog toward a predetermined position of rotation, the first mentioned member having means so constructed and arranged relative to said teeth and dog that upon reversal of alternately opposite movements between said members beyond said predetermined range of movement said dog will be caused to be alternately moved between two different pivotal positions thereof, and means on the first mentioned member projecting outwardly beyond said teeth for engagement with said dog to thereby offer an abnormal resistance to movement of said members toward operative engagement upon contact between said dog and said means.

10. A latch mechanism comprising, in combination, a pair of members pivotally connected together, ratchet teeth fixed with respect to one of said members, a dog pivotally mounted on the other of said members in a position to be engageable with said teeth within a predetermined range of movement between said members, spring means constantly urging said dog toward a predetermined position of rotation, the first mentioned member having means so constructed and arranged relative to said teeth and dog that upon reversal of alternately opposite movement between said members beyond said predetermined range of movement said dog will be caused to be alternately moved between two different pivotal positions thereof, and means for effecting a sensible resistance to further pivotal movement between said members when said dog is about to enter said predetermined range of movement during movement of said members toward latching position.

JOHN W. STRIBLING.